Patented Oct. 4, 1932

1,881,158

UNITED STATES PATENT OFFICE

LEONIDAS ALEXANDROU, OF NEW YORK, N. Y.

GRAPE JUICE COMPOSITION AND PROCESS OF PREPARING THE SAME

No Drawing.    Application filed November 27, 1929.    Serial No. 410,252.

This invention relates to compositions consisting essentially of grape juice, and to a process of preparing the same.

In spite of the fact that grape juice preeminently fulfils the requirements of a satisfactory fruit juice for daily consumption it heretofore has enjoyed only a very limited use (e. g., in the preparation of wines and wine-testing grape juice), and its value in diet has not been well known. This may, at least in part, be due to the fact that heretofore its uses for culinary purposes have been considered to necessitate much work, skill and training.

I have found a base composed of the juice of fresh ripe grapes, sugar, gelatin and the juice of citrus fruit, with or without the addition of other flavorings and/or coloring matters. This base, upon sterilization by known methods, possesses good keeping qualities and, more especially, the characteristic flavor and palatability of the freshly extracted juice. The said base may be used, as such, as an appetizing drink or in the preparation of a variety of desserts. It is not intended that the base shall be diluted with water, since such diluation appears to change the flavor and palatability of the product.

In practicing my invention I sweeten the strained, freshly extracted, juice of fresh ripe grapes (i. e., normal grape juice) by the addition of sufficient cane sugar to raise the specific gravity of the solution to from 14° to 16° Baumé, and at once heat the sweetened juice, raising its temperature to about 160° F. At this point heating of the sweetened juice is discontinued, and there is added thereto a relatively small amount of citrus fruit juice and softened gelatin, with or without additional flavoring and/or coloring. While the resulting composition is suitable for immediate use, as a drink or as a base for cold soups and desserts, and must be used within a short period,—say about twenty-four hours,—following its preparation, I prefer to sterilize or pasteurize the said composition by known methods such as, for example, heating in a closed container (which may be the final receptacle of the product e. g., a glass bottle) for about five minutes at 185° F. or at a somewhat higher temperature short of boiling, to preserve the same.

According to a preferred embodiment of the invention, I add, to one gallon of the juice which has been sweetened and heated in the manner set out above, 0.5 oz. of gelatin, the juice of one orange, the juice of one-half lemon, and about two teaspoonfuls of vanilla extract. The gelatin is soaked for about ten minutes in a cupful of cold grape juice, and the soaked (i. e., softened) gelatin, together with the citrus fruit juice and the vanilla extract, is incorporated into the previously sweetened and heated grape juice, in which latter the soaked gelatin dissolves.

The color and flavor of the composition may be altered by the use of a somewhat larger proportion of the citrus fruit juice; as, for example, by using the juice of an additional lemon in the above specific recipe.

By the use of this base, either as the sole flavoring or in conjunction with other flavorings, palatable sherbets, ice creams, frappés, frozen puddings and the like, readily may be prepared.

It is to be understood that by the expression "normal grape juice" as used in the foregoing description and in the appended claims I mean the undiluted and unconcentrated fresh juice of fresh ripe grapes.

I claim:

1. Process of making an improved composition consisting essentially of grape juice, which comprises sweetening with sugar freshly extracted juice of fresh grapes in amount sufficient to raise the specific gravity thereof to from 14° to 16° Baumé, heating the sweetened juice to about 160° F., and thereafter incorporating therein gelatin and a relatively small amount of citrus fruit juice.

2. Process of making an improved composition consisting essentially of grape juice, which comprises sweetening with sugar freshly extracted juice of fresh grapes in amount sufficient to raise the specific gravity thereof to from 14° to 16° Baumé, heating the sweetened juice to about 160° F., and thereafter incorporating therein softened gelatin, a relatively small amount of citrus fruit juice, and sterilizing the resulting product by heating the same in a closed container for about five minutes at at least 185° F.

3. Process of making an improved composition consisting essentially of grape juice, which comprises sweetening with sugar freshly extracted juice of fresh grapes in amount sufficient to raise the specific gravity thereof to from 14° to 16° Baumé and heating the sweetened juice to about 160° F., separately soaking gelatin in a small amount of grape juice, incorporating the resulting softened gelatin together with orange and lemon juices and vanilla extract into the previously sweetened and heated grape juice, and sterilizing the resulting product by heating the same in a closed container for about five minutes at at least 185° F.

4. A composition comprising normal grape juice, cane sugar, gelatin, orange and lemon juices, and vanilla extract, being further characterized in that the content of sugar is equivalent to the amount necessary to raise the specific gravity of normal grape juice to from 14° to 16° Baumé and in that the contents of the other named components are, with respect to one gallon of the sugar in grape juice solution, 0.5 ounce of the gelatin, juice of one orange, juice of at least one-half lemon, and about two teaspoonfuls of the vanilla extract.

In testimony whereof I hereto affix my signature.

LEONIDAS ALEXANDROU.